United States Patent [19]

Datta et al.

[11] Patent Number: 5,225,483

[45] Date of Patent: Jul. 6, 1993

[54] THERMOPLASTIC COMPOSITION OF POLYPROPYLENE AND STYRENE COPOLYMER RESINS

[75] Inventors: Sudhin Datta, Matawan; Narayanaswami R. Dharmarajan, Highland Park, both of N.J.; Jean M. Dekoninck, Melin, Belgium; Donald A. White, Keasbey, N.J.

[73] Assignee: Exxon Chemical Patents Inc., Linden, N.J.

[21] Appl. No.: 733,561

[22] Filed: Jul. 22, 1991

[51] Int. Cl.$^5$ .................. C08G 63/91; C08L 57/10
[52] U.S. Cl. .................................... 525/73; 524/516; 524/517; 524/518; 524/519; 524/522; 524/526; 525/74; 525/75; 525/77; 525/78
[58] Field of Search .................. 525/75, 78, 74, 73, 525/77

[56] References Cited

U.S. PATENT DOCUMENTS

| | | | |
|---|---|---|---|
| 3,748,316 | 7/1973 | Collette et al. | 260/80.75 |
| 3,796,687 | 3/1974 | Collette et al. | 260/47 |
| 3,856,765 | 12/1974 | Collette et al. | 260/80.73 |
| 3,884,888 | 5/1975 | Collette et al. | 260/80.78 |
| 3,901,860 | 8/1975 | Collette et al. | 260/80.78 |
| 4,017,669 | 4/1977 | Collette et al. | 526/169 |
| 4,251,644 | 2/1981 | Joffrion | 525/64 |
| 4,351,920 | 9/1982 | Ariga et al. | 525/67 |
| 4,367,310 | 1/1983 | Henton | 525/67 |
| 4,386,187 | 5/1983 | Grancio et al. | 525/96 |
| 4,386,188 | 5/1983 | Grancio et al. | 525/96 |
| 4,456,732 | 6/1984 | Nambu et al. | 525/65 |
| 4,469,843 | 9/1984 | Lordi | 525/67 |
| 4,491,647 | 1/1985 | Dean | 525/67 |
| 4,569,969 | 2/1986 | Jones et al. | 525/67 |
| 4,663,989 | 5/1987 | Brodbeck | 74/781 |
| 4,742,116 | 5/1988 | Schepers et al. | 525/74 |
| 4,753,997 | 6/1988 | Shyu et al. | 525/259 |
| 4,968,747 | 11/1990 | Mallikarjun | 525/74 |
| 4,970,200 | 11/1990 | Birkmayer et al. | 514/52 |
| 4,987,200 | 1/1991 | Datta et al. | 526/75 |

FOREIGN PATENT DOCUMENTS

| | | |
|---|---|---|
| 0140422A1 | 5/1985 | European Pat. Off. . |
| 0295076 | 12/1988 | European Pat. Off. . |
| 0321293 | 6/1989 | European Pat. Off. . |
| 2-37943 | 8/1990 | Japan . |

OTHER PUBLICATIONS

Chow, C. D., "Molecular Weights of Styrene-Maleic Anhydride Copolymers" *Journal of Applied Polymer Science*, vol. 20, pp. 1619 to 1626 (1976).

*Primary Examiner*—Jacob Ziegler
*Attorney, Agent, or Firm*—J. E. Schneider

[57] ABSTRACT

A thermoplastic composition is provided which comprises a blend of a thermoplastic, such as a copolymer of styrene and maleic anhydride; polypropylene; a modified elastomeric component, such as EPM or EPDM, which has been modified with a specified functional monomer, such as a 2-substituted-5-norbornene, and an amine-modified maleic anhydride grafted polypropylene. The composition has improved properties.

24 Claims, No Drawings

THERMOPLASTIC COMPOSITION OF POLYPROPYLENE AND STYRENE COPOLYMER RESINS

BACKGROUND OF THE INVENTION

1. Field of the Invention

The invention relates to a thermoplastic composition having improved properties such as impact strength. It particularly relates to blends of polypropylene with a copolymer of styrene and maleic anhydride, an elastomeric EPM or EPDM which has been modified with specified functional groups, and a polypropylene modified with specified functional groups.

2. Description of Information Disclosures

Various blends of thermoplastics and elastomers are known.

U. S. Pat. No. 4,742,116 discloses a thermoplastic moulding composition comprising a mixture of (A) copolymer of styrene and/or alpha methylstyrene and maleic anhydride, and (B) an ethylene-propylene modified rubber or an ethylene-propylene-diene modified rubber, said rubber having been modified by grafting thereto a compound containing hydroxyl, amide or amine groups.

European Publication 0140422-A1 published May 8, 1985 (European patent application 842013807 filed Sep. 27, 1984) discloses a process for preparing a thermoplastic moulding composition by mixing styrene and/or methylstyrene, maleic anhydride with a rubber modified with hydroxyl groups (e. g. EP or EPDM rubber), in the presence of a specified amount of reaction accelerator such as an organic compound of a metal of groups II, III and IV of the Periodic Table of Elements.

U. S. Pat. No. 3,856,765 discloses copolymers of ethylene, propylene, with or without a diene, and functional monomer which may be a 2-substituted-5-norbornene.

European Patent Publication 0321293 published Jun. 21, 1989 (European Patent Application 88311965-3 filed Dec. 16, 1988) discloses improved polybutylene terephthalate moulding composition comprising a minor amount of a copolymer of ethylene, a higher alpha olefin, optionally a polymerizable non-conjugated diene, and a 2-substituted-5-norbornene in which the 5-norbornene substituent may be carboxyl, hydroxyalkyl, amino, N-aminoalkyl or N-aminoaryl.

U.S. Pat. No. 4,987,200 discloses ethylene-propylene elastomers comprising a 2-substituted-5-norbornene monomer.

U.S. Pat. No. 4,251,644 discloses blends of modified EPM or modified EPDM polymers with polyesters such as dacron or polyamides such as nylon. The modified EPM or EPDM incorporates highly polar groups such as amine groups, amide groups, thio groups, ethepaopoups, and ester groups.

U.S. Pat. No. 4,663,989 and U.S. Pat. No. 4,569,969 disclose a moulding composition comprising (a) styrene maleic anhydride-methyl methacrylate terpolymer which contains a rubber component (optional in U.S. Pat. No. 4,569,969), (b) an ABS or MBS polymer, and (c) polycarbonate resin. The polyblend exhibits a marked increase in Izod impact over a similar polyblend without the termonomer component of (a).

U.S. Pat. No. 4,491,647 discloses a polyblend comprising a thermoplastic PC and at least one copolymer selected from methylmethacrylate/n-phenylmaleimide and EPDM-g-methylmethacrylate/n-phenylmaleimide.

In one embodiment, the polyblend consists of an ABS resin and/or a rubber modified SMA.

U.S. Pat. No. 4,469,843 discloses a moulding composition of a rubber modified SMA non-equimolar copolymer and a PC resin. The rubber is a conjugated diene-styrenic copolymer containing 65 wt. % or more of conjugated diene.

U.S. Pat. No. 4,456,732 discloses a blend of PC, rubber modified SMA and an epoxy resin. The thermoplastic resin composition has improved weld strength.

U.S. Pat. No. 4,367,310 discloses a blend of bisphenol-A type polycarbonate with (1) a grafted and non-grafted rubber, such as diene rubber or a diene rubber grafted with a polar polymer (2) SMA and (3) a compatible polymer such as styrene acrylonitrile (SAN). These blends exhibit improved impact strength, melt flow and heat resistance. A typical example of such a blend is one consisting of PC, SMA, ABS resins (containing grafted and non-grafted butadiene rubber) and SAN.

U.S. Pat. No. 4,351,920 discloses a thermoplastic resin composition containing (a) 5 to 40 wt. % of a rubber modified SMA and (b) 95 to 60% of a PC resin as main components.

U.S. Pat. No. 4,386,187 and U.S. Pat. No. 4,386,188 disclose a polymer blend comprising a polyolefin such as polyethylene or polypropylene as major component, a styrene polymer which may be a styrene-maleic acid copolymer, and a styrene-butadiene-styrene block copolymer compatibilizer.

U.S. Pat. No. 4,753,997 discloses a method of grafting maleic anhydride or maleic acid styrene onto polyolefins such as propylene polymers by mixing maleic anhydride, a free radical initiator comprising an organic peroxide, a polyolefin, and a catalyst, such as a N,N-dialkylethanol-amine and heating the mixture to an elevated temperature.

Japanese Patent Publication 237943 published Aug. 28, 1990 (early publication dated Mar. 28, 1983) discloses a polypropylene composition containing a polypropylene component, an elastomeric copolymer of ethylene and propylene and a modified polyethylene component having as modifying group an amino group, a secondary amino group, a tertiary amino group, a hydroxyl group, a tri (hydrocarbyloxy) silyl group, or an oxysilaryl group.

U.S. Pat. No. 4,968,747 discloses a thermoplastic resin composition containing a crystalline polypropylene component, an elastomeric olefin polymer, random styrenic copolymers and epoxy group-containing copolymers. A two-step blending process for producing the disclosed resins is also discussed.

Although the known blends of thermoplastic polymers and elastomers have some improved properties, there is still a need to improve the properties of thermoplastic polymers, such as, for example, polypropylene.

It has now been found that properties, such as impact strength, of thermoplastic blends, such as a blend of a copolymer of styrene and maleic anhydride with polypropylene, can be improved by blending them with an elastomeric EP or EPDM which has been modified by specified functional groups and a polypropylene modified with specified functional groups.

SUMMARY OF THE INVENTION

In accordance with the invention, there is provided a thermoplastic composition comprising a blend of: (a) a thermoplastic component selected from the group consisting of a copolymer of styrene and maleic anhydride, a copolymer of alpha methylstyrene and maleic anhydride, copolymers of styrene and acrylic acid, terpolymers of styrene, maleic anhydride and methyl acrylate, copolymers of styrene and vinyl oxazoline and mixtures thereof; (b) polypropylene; (c) an elastomeric polymer of ethylene, at least one higher alpha olefin, optionally, a non-conjugated diene, modified with specified functional groups and, (d) a polypropylene modified with specified functional groups.

The term "modified with specified functional groups" is intended herein to denote a polymer that contains or has been modified by reaction or series of reactions to contain at least one functionality reactive towards the cyclic anhydride or acid functionality present in component (a). Other inert [i.e., unreactive towards the cyclic anhydride functionality present in component (a)] functional groups may also be present in the modified polypropylene. Suitable reactive functional groups include alcohol and primary and secondary amine.

For example, polymers containing specified functional group may be made according to the process described in U.S. Pat. No. 4,970,200 wherein the copolymer of ethylene, at least one higher alpha olefin, optionally a non-conjugated diene and functional group-containing monomer are polymerized. The said functional group-containing monomer is an unsaturated monomer having the general formula:

$$R^1(X)_n$$

wherein $R^1$ is an ethylenically unsaturated hydrocarbyl radical, X is selected from the group consisting of hydroxy (—OH), amino (—$NHR^2$), and thio (—SH), moieties, wherein $R^2$ is selected from the group consisting of hydrogen and hydrocarbyl groups, and n is an integer of at least 1.

DETAILED DESCRIPTION OF THE INVENTION

The thermoplastic composition of the present invention comprises a blend of a thermoplastic component (a), polypropylene (b), an elastomeric component (c) which may be an elastomeric copolymer of diene (e.g. EPDM), wherein the elastomer has been modified with a specified functional group, and (d) a polypropylene modified with specified functional groups. The composition may also comprise conventional fillers, processing aids, antioxidants, and the like.

THE THERMOPLASTIC COMPONENT (A)

The thermoplastic component (a) may be copolymers of styrene and an unsaturated dicarboxylic acid or an unsaturated dicarboxylic acid derivative. For example, the thermoplastic component (a) may be copolymers of styrene and acrylic acid, terpolymers of styrene, maleic anhydride and methyl acrylate, copolymers of styrene and vinyl oxazoline and mixtures thereof, or a copolymer of styrene and/or alpha methylstyrene and maleic anhydride which may suitably comprise from about 1 to about 25 weight percent, preferably from about 5 to about 25 weight percent maleic group derived moieties. By "maleic moieties" with reference to polymers is intended herein a group derived from maleic anhydride or maleic acid. After incorporation in the polymer, the maleic derived group is a succinic anhydride group. For simplicity of description, copolymer or terpolymer derived from the maleic group-containing reactant will be designated "maleic moieties". The weight average molecular weight of the styrene and/or alpha methylstyrene and maleic anhydride copolymers may range from about 30,000 to about 500,000, preferably from about 100,000 to about 400,000, as determined in accordance with the method described in Journal of Applied Polymer Science, Vol. 20, 1619 to 1626 (1976). The copolymers of styrene and/or alpha methylstyrene and maleic acid and methods of preparing them are known.

Additional polymers which can be used as the thermoplastic component of the invention are listed in U.S. Pat. No. 4,968,747 at Col. 3, line 19 through Col. 6, line 20.

THE POLYPROPYLENE COMPONENT (B)

Component (b) is polypropylene. The term "polypropylene", herein also designated "PP", includes homopolymers of propylene as well as reactor copolymers of polypropylene (RCPP) which may contain from 1 to about 20 weight percent ethylene or an alpha olefin comonomer of 4 to 16 carbon atoms. The propylene may be highly crystalline isotactic or syndiotactic polypropylene. The RCPP can be either a random or block copolymer. The density of the PP or RCPP may range from about 0.84 to about 0.96 g/cc, typically from about 0.89 to about 0.91 g/cc.

The polypropylene component is generally present as a major component of the composition, that is, at least about 50 weight percent of the sum of components (a)+(b)+(c)+(d). However, it may be present in amounts ranging from about 10 to about 90 weight percent of the sum of the polymer components. Preferably, the polypropylene is present in an amount of at least about 50 weight percent of the sum of the polymers.

THE ELASTOMERIC COMPONENT (C)

The elastomeric polymer suitable as component of the present composition is an elastomeric copolymer of ethylene, and at least one higher alpha olefin, said copolymer having been modified totally or partially with certain functional groups or an elastomeric terpolymer of ethylene, at least one higher alpha olefin, and at least one non-conjugated diene, said terpolymer having been modified totally or partially with certain functional groups.

Suitable elastomeric copolymers include random copolymers of ethylene and at least one higher alpha olefin. The term "higher alpha olefin" is used herein to denote an alpha olefin having a higher molecular weight than ethylene. The higher alpha olefin may be a $C_3$ to $C_{16}$ alpha olefin, such as propylene, 1-butene, 1-pentene, 1-hexene, 1-octene, 1-dodecene, and mixtures thereof. Preferably, the higher alpha olefin is propylene. The elastomeric copolymers useful in this invention may suitably comprise from about 20 to about 90 weight percent ethylene, preferably from about 30 to about 85 percent ethylene. The elastomeric copolymer will generally have a weight average molecular weight (Mw) in the range of about 10,000 to about 1,000,000 or higher, typically from about 15,000 to about 500,000 and be substantially amorphous. By "substantially amorphous" with reference to the copolymer is intended herein a degree of crystallinity of less than about 25%, preferably less than about 15%, as measured by conventional test methods. The preferred elastomeric copolymer is an ethylene-propylene copolymer rubber, herein designated EPM. Processes for producing such elastomeric monoolefin copolymers are well known and form no part of this invention. EPM elastomers are commercially available.

The terpolymers suitable for practice of the present invention include terpolymers of ethylene, at least one higher alpha olefin, and at least one non-conjugated diene. The terpolymer is generally substantially amorphous and can have a substantially random arrangement of at least the ethylene and the higher alpha olefin monomers.

The terpolymer will generally have a weight average molecular weight (Mw) in the range between about 10,000 and 1,000,000 or higher, typically between about 15,000 and 500,000, and more typically between about 20,000 and 350,000.

Typically, the terpolymer is "substantially amorphous," and when that term is used to define the terpolymer, it is to be taken to mean having a degree of crystallinity less than about 25 percent, preferably less than about 15 percent, and more preferably less than about 10 percent, as measured by means known in the art.

The terpolymer useful for the practice of the present invention may comprise from about 20 to 90 weight percent ethylene, preferably about 30 to 85 weight percent ethylene, and even more preferably about 35 to about 80 weight percent ethylene.

The higher alpha-olefins suitable for use in the preparation of the terpolymer are preferably $C_3$-$C_{16}$ alpha-olefins. Illustrative non-limiting examples of such alpha-olefins are propylene, 1-butene, 1-pentene, 1-hexene, 1-octene, and 1-dodecene. The alpha-olefin content of the terpolymer is generally from about 10 to about 80 weight percent, preferably from about 20 to about 70 weight percent. The preferred alpha-olefin for the purposes of this invention is propylene.

The non-conjugated dienes suitable for use in the preparation of the terpolymer include dienes having from 6 to 15 carbon atoms. Such diene monomers are selected from polymerizable dienes. Representative examples of suitable non-conjugated dienes that may be used to prepare the terpolymer include:

a. Straight chain acyclic dienes such as: 1,4 hexadiene; 1,5-heptadiene; 1-6 octadiene.
b. Branched chain acyclic dienes such as: 5-methyl-1, 4-hexadiene; 3,7-dimethyl-1-6-octadiene, and 3,7-dimethyl-1,7-octadiene.
c. Single ring alicyclic dienes such as: 4-vinylcyclohexene; 1-allyl, 4-isopropylidene cyclohexane; 3 allylcyclopentene; 4-allyl cyclohexene; and 1-isopropenyl-4-butenyl cyclohexane.
d. Multi ring alicyclic fused and bridged ring dienes such as: dicyclopentadiene; alkenyl, alkylidene, cycloalkenyl and cycloalkylidene norbornenes such as: 5-methylene-2-norbornene 5-methylene-6-methyl-2-norbornene; 5-methylene-6, 6-dimethyl-2-norbornene; 5-propenyl-2-norbornene; 5-(3-cyclopentenyl)-2-norbornene; 5-ethylidene-2-norbornene; and 5-cyclohexylidene-2-norbornene, etc.

The preferred dienes are selected from the group consisting of 1,4-hexadiene; dicyclopentadiene; 5-ethylidene-2-norbonene; 5-methylene-2-norbornene; and mixtures thereof.

The total diene monomer content in the terpolymer may suitably range from about 0.1 to about 15 weight percent, preferably 0.5 to about 12 weight percent, and most preferably about 1.0 to about 6.0 weight.

Preparations of terpolymers of ethylene, a higher alpha olefin and a non-conjugated diene of the type described above are well known and form no part of this invention. The preferred terpolymers for the practice of the invention are terpolymers of ethylene, propylene and a non-conjugated diene (EPDM). Such terpolymers are commercially available.

The elastomeric ethylene copolymer or ethylene terpolymer described above are modified so as to incorporate a small amount, suitably about 0.1 to 15 weight percent, preferably about 0.25 to 10 weight percent (based on the weight of the copolymer or terpolymer) of a functional group-containing monomer. The term "functional group-containing monomer" is used herein to designate an unsaturated, functionalized monomer comprising a hydroxyl, thio, amino $R^1 (X)_n$ wherein $R^1$ is an ethylenically unsaturated hydrocarbyl radical, and X is selected from the group consisting of hydroxy (—OH) and amino (—$NHR^2$) groups and thio (—SH) moieties, and wherein n is an integer of at least 1, preferably 1 to 4, and more preferably 1 to 2. $R^2$ in the above (—$NHR^2$) group comprises H or hydrocarbyl (preferably H or saturated hydrocarbyl), e.g. of 1 to 15 carbon atoms, and preferably alkyl of 1 to 5 carbon atoms, cycloalkyl of from 3 to 7 carbon atoms, and the like. Exemplary of such carboxy groups are —C(O)OH and the like. Exemplary of such amino groups are —$NH_2$ and alkyl amino groups, e.g., —$NHCH_3$, —$NHC_2H_5$, —$NHC_3H_7$, —$NHC_4H_9$, and the like.

The unsaturation in $R^1$ is such that it is easily polymerized by Ziegler catalysts. As used herein $R^1$ preferably contains from 2 to 25 carbon atoms and preferably from 2 to 16 carbon atoms. In particular, $R^1$ is selected from the group consisting of radicals derived from ethylene, alpha-olefins, homologues of alpha-olefins, norbornene and homologues of norbornene, or from the group consisting of vinyl and allyl radicals. Representative examples of such unsaturation are alpha-olefin types shown as (A) and the unsaturation in the norbornene system shown as (B):

$H_2C=CH-(C_mH_{2m})$ (A)

$R''-(C_p H_{2p})$ (B)

wherein R" comprises norbornyl, m is an integer of from 1 to 30, and p is an integer of from 1 to 30. Preferably m and p are integers of from 0 to 12. More preferably m is 0, 1, or 2, and p is 1, 2 or 3. It will be understood that the —$C_mH_2$,— and —$C_pH_{2p}$— groups can be branched or straight chained, and that the norbornene ring can be substituted with the —$C_pH_{2p}$— group at the C-2 or C-7 position, i. e. R" can comprise bicyclo [2.2.1] hept-5-en-2-yl, or bicyclo [2.2.1] -hept-2-en-7-yl, respectively:

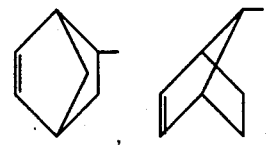

$R^1$ preferably contains from 2 to 25 carbon atoms, and is selected preferably from one of the two classes shown in (A) and (B). Suitable examples from the alpha-olefin unsaturation type includes vinyl, allyl and the higher homologues as represented by integral values of m. Suitable examples of the norbornene unsaturation type include norbornene and its higher homologues represented by integral values for p. More preferably, $R^1$ may contain up to 16 carbon atoms. Preferably, n is the number of functionality sites per FGM and has non-zero integral values between 1 and 5, and more preferably between 1 and 3.

The functional group monomer is preferably soluble in the liquid hydrocarbon solvent or diluent selected for use in the subsequent polymerization reaction (e.g., saturated hydrocarbon solvents, such as hexane).

Exemplary of functional group-containing monomers are members selected from the group consisting of norbornenyl-methanols, norbornenyl-carboxaldehydes, norbornenyl-methyl amines, norbornenyl-carboximines, and allyl alcohol, and the functional monomers are preferably selected from the group consisting of 5-norbornenyl-2-methanol, 5-norbornenyl-2-methylamine, and allyl alcohol, and mixtures thereof.

The most preferred $R^1$-(X)n (or FGM) are the following:

a) 5-norbornene-2-methylamine
b) 5-norbornene-2-methanol,
c) 5-norbornene-2-carboxaldehyde,
d) 5-norbornene-2-carboxy-(N-n-butyl) imine,
e) 5-norbornene-2-carboxy-(N-phenyl) imine, The FGM may also include multiple functionality, that is the $R^1$ moiety may be substituted by more than one "X" group, in which case the functional "X" groups may be the same or different as long as they are selected from the previously identified group of carboxyl, hydroxyl, thio, and amino groups. Exemplary of such multiple functionality FGM's are 5-norbornene-2,3-dicarboxylic acid; 5-norbornene2,3-dicarboxyaldehyde; 5-norbornene-2,3-di(carboxy-(Nphenyl(imine); 4-hydroxy-5-methyl carboxy- hex-1-ene; and $CH_3CH(CO_2H)CH(CO_2H)CH_2CH=CH_2$.

The hydrocarbyl radical in FGM will preferably be norbornyl, or vinyl, in structure with particular preference for norbornyl functionalized at the C-2 position or alpha-olefins functionalized at the C-3 position. Notwithstanding the previously mentioned preferred unsaturated, functionalized monomers, it should be understood that the functional groups may be located at other positions on the hydrocarbyl radical component of the monomer, and it will be further understood that mixtures of such FGM can be employed, if desired.

The functional group monomers useful in this invention may be prepared by conventional methods and detailed description of such FGM preparations is not needed for a complete understanding of this invention. For example, 5-norbornene-2-carboxylic acid can be formed by a Diels Alder addition of cyclopentadiene to acrylic acid, which can be illustrated by the reaction:

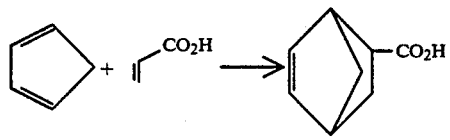

A preferred functional group-containing monomer is a 2-substituted-5-norbornene. The substituent in the 2 position of the norbornene ring can be hydroxyalkyl, amino N-aminoalkyl or N-aminoaryl, in which the alkyl or aryl moiety contains from one to 16 carbon atoms.

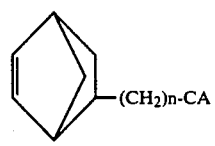

in which n is 0 to 3, A is $-H_2OH$ or $-H_2NHR$ and in which R is H, an alkyl or an aryl moiety having from one to 16 carbon atoms. A resin of the resulting modified elastomeric ethylene copolymer or terpolymer will generally have a Mooney viscosity ranging from about 5 up to about 100 when measured at 127° C. according to ASTM D-1246.

The modified ethylene higher alpha olefin elastomers of the present invention can be prepared by procedures known in the art. They can be prepared, for example, by the procedures set forth in U.S. Pat. Nos. 3,884,888, 3,748,316, 3,796,687, 3,901,860 or 4,017,669. These patents teach the preparation of elastomeric ethylene random terpolymers and tetrapolymers from alpha-olefins non-conjugated dienes and unsaturated functional monomers by direct Ziegler-Natta polymerization of the monomers, usually in solvent, utilizing catalyst systems composed of trivalent, and higher, vanadium compounds, organoaluminum compounds and halogenated reactivator compounds. These polymerization reactions are run in the absence of moisture in an inert atmosphere and in a preferred temperature range of 0° to 65° C. Both continuous and batch reactions are taught.

The modified copolymers of ethylene and a higher alpha olefin suitable for the practice of this invention can also be prepared by the process disclosed in European Publication No. 0295076 published Dec. 14, 1988 based on European Patent Application 88305222.7 which corresponds to allowed U.S. patent application 059,711, the teachings of which are hereby incorporated by reference. In accordance with the disclosure of this European publication, ethylene, alpha-olefins, non-conjugated dienes and unsaturated functional monomers chemically "masked" by pre-reaction with certain non-halogenated organometallic compounds, can be copolymerized in a conventional Ziegler-Natta polymerization reaction utilizing, e.g., vanadium, zirconium or titanium catalysts with organoaluminum co-catalysts and conducted generally in solvent at temperatures ranging preferably from about 15°-60° C. The modified copolymers or terpolymers of ethylene and propylene useful in the practice of the present invention can then be produced by de-ashing the initially formed polymer by known methods utilizing various aqueous liquids, separating the resulting aqueous phase from polymer-rich solvent phase and separating the polymer from the polymer-rich solvent phase.

Component (c) may also be a copolymer of ethylene and at least one higher alpha olefin or a terpolymer of ethylene, at least one higher alpha olefin and a non-conjugated diene, modified with certain functional groups by post-polymerization grafting reactions.

Functional groups are present to modify the reactivity of the copolymer or terpolymer and are those which will react with the cyclic anhydride functionality in component (a). Functional groups that will react with anhydrides are alcohol and primary and secondary amine. Selection of the functional group for component (c) will also depend on the functionality present in component (d). Generally, the functionality of components (c) and (d) will be similar so that they will both react with component (a) rather than with each other, e.g., carboxylic acid functionality in (c) and amine functionality in (d) is not desirable as it favors their mutual interaction, while amine functionality in both (c) and (d) is desirable as their mutual interaction will be disfavored and their individual interactions with component (a) favored.

The copolymer or terpolymer of this component may be modified by any process known to those skilled in the art to introduce the desired functionality. Other functionalities may be simultaneously introduced provided that they are inert towards the cyclic anhydride functionality of component (a) and the functionality present in component (d).

The availability of cyclic anhydride modified copolymers and terpolymers suggests their reaction with a primary amine, R—$NH_2$, in which the R- group contains the desired functionality, to form an imide as a suitable process for preparing this component. The imide functionality generated simultaneously is suitably inert towards the cyclic anhydride functionality of component (a) and towards the functionalities for component (d).

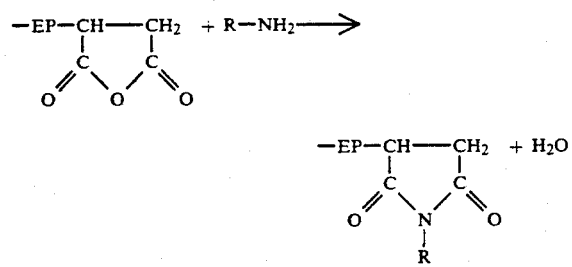

Imides formed by reaction of a copolymer or terpolymer, a cyclic unsaturated anhydride, a primary amine, R—$NH_2$ and a free radical initiator in a one or multiple step process are suitable as component (c). Preferably, the reaction is carried out in the bulk phase in appropriately designed polymer mixing equipment, such as an extruder. The preferred functionality present in the "R" group of $RNH_2$ is secondary amine or alcohol, with secondary amine being most preferred. The most preferred component (c) will be prepared from the following feedstocks:

1. A copolymer of ethylene and at least one higher alpha olefin or a terpolymer of ethylene, at least one higher alpha olefin and a non-conjugated diene.
2. A cyclic unsaturated anhydride, in which the unsaturation may be (a) conjugated with the carbonyl groups of the anhydride (e.g., maleic or citraconic anhydride) or (b) not conjugated with the carbonyl groups of the anhydride (e.g., himic anhydride).
3. A polyamine containing one primary amine functionality and at least one secondary amine functionality. Other functional groups may be present in the polyamine provided that they do not interfere with (i) the formation of the imide linkage in this component (d) and with (ii) the reaction of the secondary amine in this component (d) with the anhydride functionality of component (a). Examples of such allowable inert functionalities are tertiary amine and ether functionalities. Functionalities which may enhance the interaction with the anhydride funtionality of component (a), e.g., alcohol functionality, may also be present.

Specific examples of suitable feedstocks include:
1. A polymer containing from 40 to 80 percent by weight ethylene, from 10 to 60 percent by weight of propylene and from 0 to 10 percent by weight of ethylidenenorbornene.
2. A cyclic unsaturated anhydride selected from the group consisting of maleic, citraconic and himic anhydrides. Maleic anhydride is preferred.
3. A polyamine containing one primary amine funtionality and at least one secondary amine functionality, such as:

N-methylethylenediamine,
N-ethylethylenediamine,
N-phenylethylenediamine,
N-methyl-1,3-propanediamine,
N-phenyl-1,2-phenylenediamine,
N-phenyl-1,4-phenylenediamine,
1-(2-aminoethyl)piperazine,
4-(aminomethyl)piperidine,
2-(2-aminoethylamino)ethanol and the like. Preferred polyamines are selected from the group consisting of N-methyl-1,3-propanediamine, 1-(2-aminoethyl)piperazine and 4-(aminomethyl)piperidine. The most preferred polyamine is 1-(2-aminoethyl)piperazine.

Suitable imide modified copolymer or terpolymers contain from about 0.005 to about 0.50, preferably from about 0.01 to 0.10 moles per kilogram of the imide.

In the composition of the present invention suitable amount of modified elastomeric component ranges from about 0 to about 50 weight percent, preferably from about 5 to about 40 weight percent based on the sum of weights of the components (a)+(b) +(c)+(d).

The absolute particle size of the modified elastomeric component dispersed in the polypropylene may range from about 0.1 to about 20 microns, preferably from about 0.3 to 10 microns in diameter.

In the thermoplastic compositions prepared in accordance with the present invention, the modified copolymer or terpolymer can be used as such or various mixtures of such modified copolymers or terpolymers or mixtures thereof can be employed.

THE POLYPROPYLENE MODIFIED WITH SPECIFIED FUNTIONAL GROUPS, COMPONENT (D)

Component (d) is a modified polypropylene. Functional groups are present to modify the reactivity of the polypropylene and are those which will react with the cyclic anhydride functionality in component (a). Functional groups that will react with anhydrides are well known and include carboxylic acid, alcohol and primary and secondary amine. Selection of the functional group for component (d) will also depend on the functionality present in component (c). Generally, the functionality of components (c) and (d) will be similar so that they will both react with component (a) rather than with each other, e.g., carboxylic acid functionality in (c) and amine functionality in (d) is not desirable as it favors their mutual interaction, while amine functionality in both (c) and (d) is desirable as their mutual interaction will be disfavored and their individual interactions with component (a) favored.

The polypropylene of this component may be modified by any process known to those skilled in the art to introduce the desired functionality. Other functionalities may be simultaneously introduced provided that they are inert towards the cyclic anhydride functionality of component (a) and the functionality present in component (c).

The availability of cyclic anhydride modified polypropylenes suggests their reaction with a primary amine, R—NH$_2$, in which the R- group contains the desired functionality, to form an imide as a suitable process for preparing this component. The imide functionality generated simultaneously is suitably inert towards the cyclic anhydride functionality of component (a) and towards the functionalities for component (c).

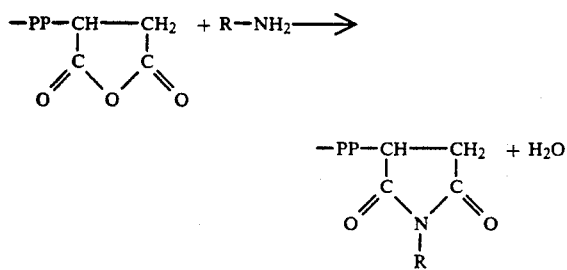

Examples of this process are provided in Japan Kokai 120608/1983, which also provides an example of a process in which the maleic anhydride grafted polypropylene is, in effect, generated in situ by reaction of polypropylene, maleic anhydride and R—NH$_2$ in the presence of a free radical initiator. In the cited publication examples are provided in which the R- group contains secondary amine functionality. It will be clear to those skilled in the art that other functionalities desirable in component (d) may also be introduced in this way, with the possible exception of primary amine.

Imides formed by reaction of a copolymer or terpolymer, a cyclic unsaturated anhydride, a primary amine, R—NH$_2$ and a free radical initiator in a one or multiple step process are suitable as component (d). Preferably, the reaction is carried out in the bulk phase in appropriately designed polymer mixing equipment, such as an extruder. The preferred functionality present in the "R" group of RNH$_2$ is secondary amine or alcohol, with secondary amine being most preferred. The most preferred component (d) will be prepared from the following feedstocks:

1. A polypropylene herein also designated "PP", including homopolymers of propylene as well as reactor copolymers of polypropylene (RCPP) which may contain from 1 to about 20 weight percent ethylene or an alpha olefin comonomer of 4 to 16 carbon atoms. The RCPP can be either a random or block copolymer. The density of the PP or RCPP may range from about 0.80 to about 0.92 g/cc, typically from about 0.89 to about 0.91 g/cc.

2. A cyclic unsaturated anhydride, in which the unsaturation may be (a) conjugated with the carbonyl groups of the anhydride (e.g., maleic or citraconic anhydride) or (b) not conjugated with the carbonyl groups of the anhydride (e.g., himic anhydride).

3. A polyamine containing one primary amine functionality and at least one secondary amine functionality. Other functional groups may be present in the polyamine provided that they do not interfere with (i) the formation of the imide linkage in this component (d) and with (ii) the reaction of the secondary amine in this component (d) with the anhydride functionality of component (a). Examples of such allowable inert functionalities are tertiary amine and ether functionalities. Functionalitite which may enhance the interaction with the anhydride functionality of component (a), e.g., alcohol functionality, may also be present.

Specific examples of suitable feedstocks include:

1. A polypropylene having from zero to 20 percent by weight of comonomer selected from the group consisting of ethylene and alpha olefin having from 4 to 16 carbon atoms, with a melt flow rate of 0.1 to 100 g/10 minutes (2.16 kg, 230° C.). Preferred feedstocks include a polypropylene with from zero to 5 percent by weight of ethylene comonomer and a melt flow rate of 0.2 to 20 g/10 minutes (2.16 kg, 230° C.).

2. A cyclic unsaturated anhydride selected from the group consisting of maleic, citraconic and hemic anhydrides. Maleic anhydride is preferred.

3. A polyamine containing one primary amine funtionality and at least one secondary amine functionality, such as:

N-methylethylenediamine,
N-ethylethylenediamine,
N-phenylethylenediamine,
N-methyl-1,3-propanediamine,
N-phenyl-1,2-phenylenediamine,
N-phenyl-1,4-phenylenediamine,
1-(2-aminoethyl)piperazine,
4-(aminomethyl)piperidine,
2-(2-aminoethylamino)ethanol and the like. Preferred polyamines are selected from the group consisting of N-methyl-1,3-propanediamine, 1-(2-aminoethyl)piperazine and 4-(aminomethyl)piperidine. The most preferred polyamine is 1-(2-aminoethyl)piperazine.

Suitable imide modified copolymer or terpolymers contain from about 0.005 to about 0.50, preferably from about 0.01 to 0.10 moles per kilogram of the imide.

Suitable amounts of polypropylene component modified with specified functional group for the composition of the present invention include from about 0 to about 40, preferably, from about 2 to about 25 weight percent, based on the sum of the weight of components (a)+(b)+(c)+(d).

Preferably, the compositions of the present invention have a secant flexural modulus ranging from about 5500 kg/cm$^2$ to about 21,000 kg/cm$^2$ measured in accordance with ASTM D790 at 1% strain.

The composition may also contain conventional components or fillers such as reinforcing agents, for instance, glass fibers, carbon fibers and asbestos; fillers exemplified by titanium dioxide, silica, alumina, silica-alumina, silicamagnesia, calcium silicate, talc, calcium carbonate, glass heads, glass flakes and the like; lubricants such as higher fatty acids and paraffin waxes, stabilizers; anti-static agents; antioxidants; fire retardants; dyes; pigments; plasticizers; mould release agents and the like.

The components, and, if used, conventional additives are mechanically blended and moulded in a known manner. The method of preparing the blends is not a critical aspect of the present invention and the components may be admixed in any order using standard polymer blending techniques and apparatus. Generally the components may be mixed in a mixer, such as a ribbon blender, V-shaped blender, tumbler or Henschel mixer, and then melt-kneaded at temperatures of about 170° C. to 250° C., preferably about 180° C. to 230° C., in a Banbury mixer, a Brabender mixer, single or multi-screw, e.g. twin screw, extruder, rolling mill, continuous extruder or the like. For example, suitably dried and preselected amounts of the ingredients can be mixed in a blender and fed into a grinder for pelletization. The resulting pellets or granules may thereafter be injection moulded.

One method of blending the components is to blend them in an intensive shear mixing equipment which can maintain a temperature between 170° C. and 250° C., and above the melting point of the thermoplastic component, such as, for example, Brabender ® mixers, Banbury ® mixers (for batch mixing) as well as single and twin extruders (for continuous mixing). Preferably the shearing is performed at conditions to disperse the modified elastomeric polymer in said thermoplastic component as particles ranging in absolute size from about 0.01 to 20 microns, more preferably as particles ranging in size from about 0.01 to about 5 microns, more preferably from about 0.1 to 4 microns. A preferred method of producing the composition is as follows:

Polypropylene (PP) or polypropylene impact copolymer, copolymer of styrene and maleic anhydride (SMA), and the amine modified polypropylene (amine-PP) are mixed together in an intensive mixer such as a Brabender ® Plasticorder, Banbury ® mixer, etc. One minute after flux of the above mixture, amine modified ethylene-propylene elastomer (amine-EP) is introduced into the mixing chamber. Mixing is continued for a further 3 minutes and then terminated. The order of adding the amine-PP and the amine-EP components is not important and readily interchangeable.

Mixing in solution at high temperatures may also be performed, although it is not the preferred method. Typically the mixing time is between 3 to 20 minutes at temperatures of 200° C. to 215° C., with more or less mixing time required for lower or higher temperatures of mixing, respectively.

In an alternative embodiment, the SMA phase of the thermoplastic composition may be dynamically crosslinked during blending by the addition of a suitable crosslinking agent. An example of a suitable crosslinking agent which can be used in the practice of this invention is a diamine. In these blends, the PP/SMA ratio should be maintained between 90/10 and 40/60 to ensure that the SMA is the discrete phase and the dynamic vulcanization of the SMA does not hinder subsequent processability. Blends containing a crosslinked SMA phase exhibit significantly improved knit line tensile properties when compared to similar blends in which the SMA phase was not crosslinked.

In the case of blends containing a crosslinked SMA phase, it is possible to preferentially locate any filler added to the composition by crosslinking the SMA prior to the addition of any filler.

The thermoplastic composition of the present invention is suitable, for example, for the manufacture of refrigerator liners, general purpose moulded goods, outdoor recreational constructions, coextrusions, coinjection mouldings and laminations with engineering thermoplastics.

PREFERRED EMBODIMENTS

Example 1

Tables 1 through Table 9 describe the blend components of the compositions of the invention and comparative compositions. Tables 15 and 16 provide a description of the polymers used in this example. Table 17 lists the test methods used.

Table 1 outlines a one step melt blending process in which the ingredients were mixed in a 300 cc. Brabender ® Plasticorder mixer. The thermoplastic resins (polypropylene impact copolymer, amine modified polypropylene and styrene maleic anhydride copolymer) were first introduced into a heated chamber of the Brabender mixer and allowed to mix with the rotors running at a low rpm. After the resins had fluxed, the functional elastomer (amine-EP) was introduced into the mixing chamber and the rotor speed was increased to 60 rpm. Mixing was terminated after 4 minutes at which time the chamber was opened and the batch removed. The mixing temperature was maintained between 180°-220° C. by suitably adjusting the mixing intensity. Butylated hydroxy toluene, BHT, (approx. 0.3 wt %) was added during mixing as antioxidant. The compositions, after grinding into pellets, were injection moulded in a Boy ® Injection Moulding machine using the following conditions:

| Barrel Temperature Ranges (°C.) | Moulding cycle (sec) |
|---|---|
| Nozzle: 200–250 | Injection Time: 8 |
| Middle: 190–210 | Cooling Time: 20 |
| Rear: 190–210 | Total Cycle Time: 28 |

Table 1 shows a series of compositions with varying PP and SMA contents. The inventive compositions are the blends that contain both amine-EP as an impact modifier and amine-PP as a compatibilizer (4 component systems). The control compositions are PP, SMA by themselves, binary blends of PP and SMA or ternary blends of PP, SMA and either amino-PP or amine-EP. In all cases the four component systems show substantially better impact properties and elongations compared to the control formulations.

Table 2 shows PP/SMA alloy compositions in which the PP/SMA ratio is 70/30. The four component system (Composition #17) has substantially better impact properties and elongation compared to control. The binary blend system (Composition #14) or the ternary blend systems containing either amine-EP (Composition #15) or amine-PP (Composition #16) have poor impact properties when compared with the inventive formulation.

Table 3 illustrates order of mixing of the functional EP and PP modifiers. Composition #18 is a masterbatch formulation of PP, SMA and amine-EP. The masterbatch was ground into pellets for subsequent processing. In Compositions 19 and 20, the amine-PP modifier was added to the masterbatch Composition #18 in a second stage mixing. Composition #21 was mixed in one step. After the flux of PP and SMA, the amine-PP was added to the mix. After 1 minute of mixing, amine-EP was added as the final component. Mixing was terminated after 3 additional minutes. The four component blends made by either a two-step mixing process or a single step process have good impact properties. The sequence of addition of amine-PP or amine-EP does not appear to be critical.

Table 4 illustrates varying mixing protocols used in formulating the four component system. Compositions 22 and 23 illustrate blends in which amine-PP is added as the last component. Compositions 24 through 26 are blends of PP, SMA +amine-EP (previously melt mixed) and amine-PP, and moulded directly into test specimens. Both the melt mix compounds and the dry blends have good impact properties. The impact properties depend only on the PP/SMA ratio of the blends.

Table 5 illustrates compositions varying in mixing protocol and containing a very high impact PP-impact copolymer grade. Compositions 27 and 28 are master batch recipes containing PP, SMA and amine-EP (three components). These are control and have poor impact properties. Compositions 29 and 30 illustrate the addition of amine-PP to the master batches as dry blends. The final compositions have good impact properties.

Table 6 illustrates four component blend systems in which the amine-EP is replaced by a non-functional EP. Compositions #31 and 32 are the respective three component systems containing EP or amine-EP polymer. The use of a non-functional EP (Composition #33) in the four component blend containing amine-PP leads to poor impact properties.

Table 7 shows four component PP/SMA systems containing varying amounts of total modifier (amine-EP +amine-PP) at a constant PP/SMA ratio (70/30) and constant amine-EP/amine-PP ratio (3/1). There is significant improvement in impact and knit line properties at total modifier levels exceeding 20 wt. %.

Table 8 shows PP/SMA four component blend compositions at constant PP/SMA ratio (70/30) and constant total modifier (amine-EP+amine-PP=20 wt. %) and varying ratios of amine-EP/amine-PP. All the compositions have good impact properties with the optimal properties achieved at amine-EP/amine-PP ratio of 3/1 (Composition #40).

Table 9 shows PP/SMA alloys of varying PP, SMA contents and containing a PP homopolymer resin. The four component blend (Composition #46) has the best impact property.

Example 2

Table 10 shows PP/SMA alloy compositions similar to the previously described blends in which the SMA phase was cross linked dynamically during blending by the addition of a diamine. The PP/SMA ratio was maintained at 70/30 where SMA is the discrete phase and dynamic vulcanization of the SMA does not hinder subsequent processability. There is substantial improvement in knit line tensile properties (Composition #51 through 54) compared to similar blends in which the SMA phase was not cross linked (Compositions #35, 36 and 37).

Example 3

Table 11 and Table 12 shows blend compositions containing a filler (titanium-dioxide) at 20 wt. % or glass fiber. In all compositions the filler or fiber was added as the last component. The filler preferentially migrates into the amorphous SMA phase (Compositions #56 and 58). However, if the filler is added to the blend after dynamic cross-linking of the SMA phase (Compositions #57 and 59), the filler is forced into the PP phase. Light microscopy studies confirmed this observation. The four component blends containing filler have high impact properties, while in the binary blend systems cross linking the SMA (Composition #57) produced better impact properties The PP/SMA alloy compositions containing glass fiber were compared with corresponding formulations of glass fiber reinforced impact modified SMA (compositions # 62 and 64). In all cases the inventive glass compounds of filled PP/SMA alloys (compositions # 60, 61 and 63) have better impact properties than the comparative formulations.

Example 4

Table 13 illustrates the adhesion of PP/SMA alloy four component systems to a mineral filled ABS substrate. The test specimens for lamination were injection moulded into bars 8"×0.5"×0.125". The laminates were formed in a compression press at 450° F. and 100 psi pressure, with a over-hang of each substrate. The laminated assembly was pulled in tension so that the substrates were in relative shear (lap shear mode). The control PP/ABS laminate (#66) delaminated immediately showing no adhesion. The ABS, PP/SMA alloy laminates failed cohesively showing adhesion of the four component PP/SMA alloys to ABS (#67, 68 and 69). In addition PP/SMA systems that are either binary blends of PP and SMA, or ternary blends of PP, SMA and amine-EP or amine-PP do not adhere to the AES substrate. All 4 components of PP, SMA, amine-EP and amine-PP are required in the blend for adhesion.

EXAMPLE 5

Table 14 demonstrates the chemical resistance of PP/SMA alloy systems to Hydro Chloro Fluoro Carbons (HCFC). The chemical resistance was determined by measuring property changes of injection moulded test bars immersed for 48 hours in HCFC-123, a HCFC manufactured by Allied Signal Corporation at 21° C. As expected the PP impact copolymer (Composition #76) is most resistant and shows minimal property changes. Both SMA and ABS (Composition #74 and 75) dissolved in HCFC-123. The PP/SMA alloy system (Composition # 70, 71, 72 and 73) are chemically resistant and preserve their structural integrity. The alloys swell 10–15 vol. % in HCFC-123. The property changes confirm with the observed volume swell.

Example 6

A secondary amine modified ethylene propylene copolymer was prepared by reaction of a maleic anhydride grafted ethylene propylene copolymer (43 weight percent ethylene, 0.7 weight percent maleic anhydride) with excess N-methyl-1,3-propanediamine in a 30 mm twin screw extruder.

A secondary amine modified polypropylene was prepared by reaction of a maleic anhydride grafted polypropylene (0.4 weight percent maleic anhydride) with excess N-methyl-1,3-propanediamine in the same extruder.

A blend of polypropylene impact copolymer, PD 7031, (56 weight percent) styrene maleic anhydride copolymer, containing 14 weight percent maleic anhydride (24 weight percent), the secondary amine modified copolymer (15 weight percent) and the secondary amine modified polypropylene (5 weight percent) was made in a 25 lb Banbury ® mixer, the polymers being added in the order shown above.

The blend was discharged and allowed to cool to room temperature. The cooled blend was ground and test samples moulded as described in example 1. The blend had the following properties:

| Test | Value |
|---|---|
| Notched Izod Impact (ft-lb/in) | |
| 21° C. | 17.3 |
| 0° C. | 11.8 |
| Flexural Modulus (Kpsi) | 104 |
| Tensile Strength @ break (psi) | 2582 |
| Elongation @ break (%) | 127 |

In contrast to those used in examples 1 to 5, the elastomeric modifier of the present example contains secondary rather than primary amine functionality. The observed result indicates that this functionality is comparable to the primary amine functionality in improving the impact strength of the blends.

TABLE 1
Properties of PP/SMA alloy with varying PP/SMA ratio.

| Composition # | 1 | 2 | 3 | 4 | 5 | 6 | 7 | 8 | 9 | 10 | 11 | 12 | 13 |
|---|---|---|---|---|---|---|---|---|---|---|---|---|---|
| PP Impact Copolymer (Escorene ® PD 7031) | 100 | 70 | 58 | 54 | 50 | 46 | 50 | 42 | 39 | 30 | 25 | 24 | — |
| SMA (14 wt. % MA) | — | 30 | 25 | 24 | 33 | 31 | 50 | 42 | 39 | 70 | 58 | 55 | 100 |
| amine-EP | — | — | 17 | 16 | 17 | 17 | — | 16 | 16 | — | 17 | 16 | — |
| amine-PP (16080-40-1) | — | — | — | 6 | — | 6 | — | — | 6 | — | — | 6 | — |
| Properties | | | | | | | | | | | | | |
| Notched Izod Impact (ft-lb/in) | | | | | | | | | | | | | |
| 21° C. | 16.1 | 0.6 | 1.6 | 8.8 | 0.4 | 6.2 | 0.3 | 0.4 | 2.9 | 0.3 | 0.3 | 1.4 | 0.3 |
| 0° C. | — | 0.7 | 1.5 | 7.9 | 0.3 | 3.0 | 0.4 | 0.3 | 1.5 | 0.2 | 0.2 | 1.0 | 0.3 |
| Tensile Strength (psi) | — | 3804 | 2682 | 2937 | — | — | 4076 | 3100 | — | 4076 | 2751 | — | — |
| Elongation (%) | — | 13 | 33 | 353 | — | — | 13 | 11 | — | 13 | 8 | — | — |
| Flex. Modulus (Kpsi) | 141 | 211 | 128 | 133 | 132 | 138 | 253 | 168 | 162 | 253 | 224 | 222 | 437 |
| Heat Distortion Temperature (°C.) @ 264 psi load | 50 | — | — | — | 74 | 65 | — | — | 73 | — | — | 79 | 103 | control compositions are # 1,2,3,5,7,8,10,11 and 13.

TABLE 2
Tensile properties of PP/SMA alloy containing PP/SMA at 70/30 ratio.

| Composition # | 14 | 15 | 16 | 17 |
|---|---|---|---|---|
| PP Impact Copolymer (PD 7031) | 70 | 60 | 67 | 56 |
| SMA (14 wt. % MA) | 30 | 25 | 28 | 24 |
| amine-EP | — | 15 | — | 15 |
| amine-PP (16080-54-A) | — | — | 5 | 5 |
| Properties | | | | |
| Notched Izod Impact (ft-lb/in) | | | | |
| 21° C. | 0.59 | 1.1 | 0.63 | 6.1 |
| Flex. Modulus (Kpsi) | 266 | 180 | 288 | 174 |
| Tensile Strength (psi) | 3766 | 2779 | 4733 | 2591 |
| Elongation (%) | 6 | 9 | 11 | 91 | control compositions are # 14,15 and 16.

TABLE 3
Influence of order of component mixing on PP/SMA alloy properties.

| Composition # | 18 | 19 | 20 | 21 |
|---|---|---|---|---|
| PP Impact Copolymer (PD 7031) | 58 | — | — | 55 |
| SMA (14 wt. % MA) | 25 | — | — | 24 |
| Composition # 18 | — | 94 | 92 | — |
| amine-EP | 17 | — | — | 15 |
| amine-PP (16080-48) | — | 6 | 8 | 6 |
| No. of Mixing Steps | One | Two | Two | One |
| Component Addition Sequence | None | amine-PP last | amine-PP last | amine-EP last |
| Properties | | | | |
| Notched Izod Impact (ft-lb/in) | | | | |
| 21° C. | 1.5 | 14.5 | 12.8 | 14.1 |
| 0° C. | 1.1 | 12.8 | 8.2 | 9.0 |
| Flex. Modulus (Kpsi) | 118 | 120 | 122 | 113 |
| Heat Distortion Temperature (°C.) @ 264 psi load | 70 | 63 | 60 | 57 | control composition is # 18

TABLE 4
PP/SMA alloy prepared using varying mixing routes.

| Composition # | 22 | 23 | 24 | 25 | 26 |
|---|---|---|---|---|---|
| PP Impact Copolymer (PD 7031) | 50 | 45 | 45 | 63 | 27 |
| SMA (8 wt. % MA) | 20 | 45 | — | — | — |
| SMA + 25 wt. % amine-EP | — | — | 45 | 27 | 63 |
| amine-EP | 20 | 20 | — | — | — |
| amine-PP (16080-40-1) | — | 10 | 10 | 10 | 10 |
| amine-PP (16080-40-2) | 10 | — | — | — | — |
| Mixing Process | Melt Mix | | | Dry Blends | |
| Properties | | | | | |
| Izod Impact (ft-lb/in) | | | | | |
| 21° C. - Notched | 6.0 | 9.8 | 3.4 | 4.0 | 2.0 |
| 0° C. - Notched | — | — | 1.4 | 1.3 | 1.1 |
| 21° C. - Unnotched | 13.2 | 20.9 | 23.3 | 30.7 | 14.4 |
| Flex. Modulus (Kpsi) | 201 | 278 | 177 | 161 | 190 |
| Heat Distortion Temperature (°C.) @ 264 psi load | 58 | 60 | 65 | 59 | 71 |

TABLE 5
Propeties of PP/SMA alloy containing a high impact PP Impact Copolymer matrix.

| Composition # | 27 | 28 | 29 | 30 |
|---|---|---|---|---|
| PP Impact Copolymer (Escorene ® PD 8082) | 40 | 24 | — | 63 |
| SMA (14 wt. % MA) | 40 | 56 | — | — |
| Composition # 27 | — | — | 90 | — |
| Composition # 28 | — | — | — | 90 |
| amine-EP | 20 | 20 | — | — |
| amine-PP (16080-40-1) | — | — | 10 | 10 |
| Mixing Process | Melt Mix | | Dry Blends | |
| Properties | | | | |
| Izod Impact (ft-lb/in) | | | | |
| 21° C. - Notched | 0.3 | 0.9 | 6.8 | 2.3 |

TABLE 5-continued

Properties of PP/SMA alloy containing a high impact PP Impact Copolymer matrix.

| Composition # | 27 | 28 | 29 | 30 |
|---|---|---|---|---|
| 21° C. - Unnotched | 5.9 | 3.6 | 25.4 | 29.2 | control composition are # 27 and 28

TABLE 6

Comparison PP/SMA (70/30) alloy properties with similar blends containing a non-functional EP copolymer

| Composition # | 31 | 32 | 33 | 34 |
|---|---|---|---|---|
| PP Impact Copolymer (PD 7031) | 58 | 58 | 54 | 54 |
| SMA (14 wt. % MA) | 25 | 25 | 24 | 24 |
| EP Copolymer (Vistalon ® 457) | 17 | — | 16 | — |
| amine-EP | — | 17 | — | 16 |
| amine-PP (16080-48) | — | — | 6 | 6 |
| Properties | | | | |
| Notched Izod Impact (ft-lb/in) | | | | |
| 21° C. | 0.5 | 1.1 | 0.9 | 14 |
| 0° C. | 0.5 | 0.7 | 0.5 | 8 |
| Flex. Modulus (Kpsi) | 124 | 117 | 136 | 110 | control compositions are # 31,32 and 33

TABLE 7

Properties of PP/SMA alloy at constant amine-EP/amine-PP Ratio (3/1) and varying total (amine-EP + amine-PP) modifier levels

| Composition # | 35 | 36 | 37 | 38 |
|---|---|---|---|---|
| PP Impact Copolymer (PD 7031) | 63 | 60 | 56 | 54 |
| SMA (Dylark ® 332) | 27 | 25 | 24 | 24 |
| amine-EP | 7.5 | 11 | 15 | 16 |
| amine-PP (16080-54-A) | 2.5 | 4 | 5 | 6 |
| Properties | | | | |
| Notched Izod Impact (ft-lb/in) | | | | |
| 21° C. | 1.1 | 2.3 | 7.1 | 13.9 |
| −20° C. | 0.6 | 0.8 | 2.0 | — |
| Flex. Modulus (Kpsi) | 165 | 143 | 123 | 117 |
| Tensile Strength (psi) | 4913 | 3390 | 3560 | — |
| Knit Line Tensile Strength (% Tensile Strength) | 10 | 15 | 31 | — |
| Elongation (%) | 53 | 120 | 140 | — |
| Heat Distortion Temperature (°C.) @ 264 psi load | 75 | 69 | 57 | 67 |

TABLE 8

Properties of PP/SMA alloy at 20 wt. % modifier and varying amine-EP/amine-PP ratio

| Composition # | 39 | 40 | 41 | 42 |
|---|---|---|---|---|
| PP Impact Copolymer (PD 7031) | 56 | 56 | 56 | 56 |
| SMA (14 wt. % MA) | 24 | 24 | 24 | 24 |
| amine-EP | 18 | 12 | 10 | 5 |
| amine-PP (16080-54-A) | 2 | 8 | 10 | 15 |
| Properties | | | | |
| Notched Izod Impact (ft-lb/in) | | | | |
| 21° C. | 3.9 | 9.9 | 10.8 | 10.6 |
| −20° C. | 1.4 | 2.0 | 1.7 | 0.9 |
| Flex. Modulus (Kpsi) | 112 | 128 | 138 | 155 |

TABLE 9

Properties of PP/SMA alloy with varying PP/SMA Ratio and containing a PP homopolymer matrix

| | Composition # | | | | | | | |
|---|---|---|---|---|---|---|---|---|
| | 43 | 44 | 45 | 46 | 47 | 48 | 49 | 50 |
| PP Homopolymer (Escorene ® PP 1012) | 100 | 70 | 58 | 54 | 50 | 42 | 39 | — |
| SMA (14 wt. % MA) | — | 30 | 25 | 23 | 50 | 42 | 39 | 100 |
| amine-EP | — | — | 17 | 17 | — | 16 | 16 | — |
| amine-PP (16080-48) | — | — | — | 6 | — | — | 6 | — |
| Properties | | | | | | | | |
| Notched Izod Impact (ft-lb/in) | | | | | | | | |
| 21° C. | 0.4 | 0.4 | 1.0 | 1.4 | 0.3 | 0.4 | 0.4 | 0.3 |
| 0° C. | 0.4 | 0.3 | 0.6 | 1.0 | 0.2 | 0.4 | 0.3 | 0.3 |
| Flexural Modulus (Kpsi) | 178 | 234 | 141 | 147 | 234 | 158 | 168 | 437 |
| Heat Distortion Temperature (°C.) @ 264 psi load | 55 | 73 | 55 | 62 | 82 | 64 | 73 | 103 | control compositions are #43, 44, 45, 47, 48 and 50.

TABLE 10

Compositions of PP/SMA alloy with improved knit line tensile properties.

| Composition # | 51 | 52 | 53 | 54 | 55 |
|---|---|---|---|---|---|
| PP Impact Copolymer (PD 7031) | 63 | 60 | 56 | 56 | 56 |
| SMA (14 wt. % MA) | 27 | 25 | 24 | 24 | 24 |
| amine-EP | 7.5 | 11 | 15 | 15 | 15 |
| amine-PP (16080-54-A) | 2.5 | 4 | 5 | 5 | 5 |
| Di-amine(1,8-Diamine Octane)- phr of total blend, added last | 0.9 | 0.9 | 0.9 | 1.2 | 1.5 |
| Properties | | | | | |
| Notched Izod Impact (ft-lb/in) 21° C. | 2.0 | 4.2 | 9.1 | 8.9 | 10.9 |
| Flexural Modulus (Kpsi) | 145 | 116 | 104 | 97 | 100 |
| Tensile Strength (psi) | 4751 | 3785 | 4046 | 4032 | 3684 |
| Knit Line Tensile Strength (% Tensile Strength) | 49 | 61 | 53 | 53 | 51 |
| Elongation (%) | 27 | 31 | 46 | 45 | 46 | compare compositions #51, 52, 53 with 35, 36 and 37 respectively of Table 7.

TABLE 11

Properties of PP/SMA alloy containing filler

| Composition # | 56 | 57 | 58 | 59 |
|---|---|---|---|---|
| PP Impact Copolymer (PD 7031) | 56 | 56 | 45 | 45 |
| SMA (14 wt. % MA) | 24 | 24 | 19 | 19 |
| amine-EP | — | — | 8 | 8 |
| amine-PP (16080-54-A) | — | — | 8 | 8 |
| Titanium dioxide (Filler)-added last | 20 | 20 | 20 | 20 |
| Di-amine(1,8-Diamine Octane)- phr of total blend | — | 0.3 | — | 0.3 |
| Properties | | | | |
| Polymer phase in which filler is predominantly located- by light microscopy | SMA | PP | SMA | PP |
| Notched Izod Impact (ft-lb/in) | | | | |
| 21° C. | 0.9 | 2.0 | 6.5 | 6.6 |
| 0° C. | 0.8 | 1.5 | 2.6 | 3.4 |
| Flexural Modulus (Kpsi) | 243 | 222 | 157 | 145 |
| Heat Distortion Temperature (°C.) | 83 | 76 | 60 | 58 |

TABLE 11-continued
Properties of PP/SMA alloy containing filler

| | Composition # | | | |
|---|---|---|---|---|
| | 56 | 57 | 58 | 59 |
| @ 264 psi load | | | | | control composition is #56

TABLE 12
Properties of PP/SMA Alloys containing glass fiber

| | Composition # | | | | |
|---|---|---|---|---|---|
| | 60 | 61 | 62 | 63 | 64 |
| PP Impact Copolymer (PD 7031) | 44 | 44 | — | 38 | — |
| SMA (14 wt. % MA) | 19 | 19 | — | 17 | — |
| Rubber modified SMA (Dylark ® 378) | — | — | 80 | — | 70 |
| amine-EP | 12 | 12 | — | 11 | — |
| amine-PP (16080-40-2) | 5 | — | — | 4 | — |
| amine-PP (16080-64) | — | 5 | — | — | — |
| glass fiber (⅛ in. chopped strands) | 20 | 20 | 20 | 30 | 30 |
| Properties | | | | | |
| Izod Impact (ft-lb/in) | | | | | |
| 21° C. (notched) | 1.3 | 1.6 | 0.6 | 1.5 | 0.5 |
| 21° C. (unnotched) | 3.7 | 6.4 | 2.1 | 5.5 | 2.3 |
| Tensile Strength (psi) | 5349 | 5520 | 6338 | 5755 | 7860 | control compositions are #62 and 64.

TABLE 13
Evaluation PP/SMA alloy adhesion to ABS using a lap shear test method.

| | Laminates # | | | | |
|---|---|---|---|---|---|
| | 65 | 66 | 67 | 68 | 69 |
| Acrylonitrile Butadiene Styrene (ABS) | x | x | x | x | x |
| ABS | x | | | | |
| PP Impact Copolymer (PD7031) | | x | | | |
| PP/SMA Alloy | | | | | |
| Composition #39 | | | x | | |
| Composition #40 | | | | x | |
| Composition #42 | | | | | x |
| Properties | | | | | |
| Adhesion by inspection | excellent | none delaminates | | good | |
| Lap shear test Maximum Load at Failure (lbs) | 66 | 0 | 25 | 23 | 30 | x denotes the substrates used in lamination
control laminates are #65 and 66

TABLE 14
Chemical resistance of PP/SMA alloy to HCFC+

| | Composition # | | | | | | |
|---|---|---|---|---|---|---|---|
| | 70 | 71 | 72 | 73 | 74 | 75 | 76 |
| ABS | — | — | — | — | — | 100 | — |
| PP Impact Copolymer (PD 7031) | — | — | — | — | — | — | 100 |
| SMA (14 wt. % MA) | — | — | — | — | 100 | — | — |
| PP/SMA Alloy | | | | | | | |
| PP Impact Copolymer (PD 7031) | 70 | 56 | 56 | 45 | — | — | — |
| SMA (14 wt. % MA) | 30 | 24 | 24 | 19 | — | — | — |
| amine-EP | — | 15 | — | 8 | — | — | — |
| amine-PP (16080-54-A) | —* | 5 | 20 | 8 | — | — | — |
| Titanium dioxide (Filler)-added last | — | — | — | 20 | — | — | — |
| Properties before exposure to HCFC | | | | | | | |
| Notched Izod Impact (ft-lb/in) 21° C. | 0.6 | 6.1 | 5.6 | 6.5 | 0.3 | — | 16.1 |
| Flexural Modulus (Kpsi) | 266 | 174 | 174 | 157 | — | 3.0 | 141 |
| Properties after immersion in HCFC for 48 hrs at 21° C. | | | | | | | |
| Notched Izod Impact (ft-lb/in) 21° C. | 0.9 | 11 | 11.8 | 10.4 | * | ** | 15.7 |
| Flexural Modulus (Kpsi) | 88 | 55 | — | — | * | ** | 107 |
| Volume Swell (%) | ←10 to 15→ | | | | — | — | — | control compositions are #74 and 75.
+HCFC: Hydro Chloro Flouro Carbon - HCFC 123 (Genetron ® Products) Allied Signal Corp.
*dissolves completely
**disintegrates immediately

TABLE 15
Characteristics of amine Functional PP Polymers

| Polymer # | MA in PP precursor (wt. %) |
|---|---|
| 16080-40-1 | 0.4 |
| 16080-40-2 | 1.0 |
| 16080-48 | 1.0 |
| 16080-54-A | 0.4 |
| 16080-64 | 0.4 | amine-PP: the amine is 1-(2-aminoethyl)piperazine

TABLE 16
List of Materials

| Polymer | Manufacturer | Description |
|---|---|---|
| SMA (Dylark ® 232) | Arco Chemical | Styrene-Maleic Anhydride Copolymer |

TABLE 16-continued

| List of Materials | | |
|---|---|---|
| Polymer | Manufacturer | Description |
| SMA (Dylark ® 332) | Arco Chemical | (8 wt. % maleic anhydride) Styrene-Maleic Anhydride Copolymer (14 wt. % maleic anhydride) |
| Rubber Modified SMA (Dylark ® 378) | Arco Chemical | Impact modified SMA grade |
| PP (Escorene ® PD 7031) | Exxon Chemical | Polypropylene Impact Copolymer (MFR = 4.0 g/10 min, density = 0.9 g/cc) |
| PP (Escorene ® PD 8082) | Exxon Chemical | Polypropylene Impact Copolymer (MFR = 3.0 g/10 min, density = 0.9 g/cc) |
| PP (Escorene ® PD 1012) | Exxon Chemical | Polypropylene Homopolymer (MFR = 5.0 g/10 min, density = 0.9 g/cc) |

The amine-EP used was an amine functionalized ethylene-propylene copolymer (Ethylene content = 41 wt. %, Mooney Viscosity ML (1 + 4) 125° C. = 16, Amine Content = 0.3 mole %)

TABLE 17

| Standard Test Methods | |
|---|---|
| Test | ASTM Method |
| Izod Impact (ft-lb/in) | |
| 21° C.-Notched | D 256, Method A |
| 21° C.-Unnotched | D 256, Method A |
| 0° C.-Notched | D 256, Method A |
| −21° C.-Notched | D 256, Method A |
| Flexural Modulus (Kpsi) | D 790, Method I |
| Tensile Strength (psi) | D 638 |
| Knit Line Tensile Strength (psi) | D 638 |
| Elongation (%) | D 638 |
| Heat Distortion Temperature (°C.) @ 264 psi load | D 1637 |

What is claimed is:

1. A thermoplastic composition comprising a blend of:
   (a) a thermoplastic component comprising a copolymer of styrene and an unsaturated dicarboxylic acid or dicarboxylic acid derivative;
   (b) polypropylene;
   (c) an elastomeric component selected from the group comprising
      (i) a copolymer of ethylene and at least one higher alpha olefin; or
      (ii) a terpolymer of ethylene, at least one higher alpha olefin, and at least one non-conjugated diene, said elastomeric component having been partially or totally modified with one or more functional groups;
   (d) a second polypropylene component partially or totally modified with one or more functional groups said functional groups in said elastomeric component being the same or different as said functional groups in said second polypropylene component; said functional groups being reactive with said unsaturated dicarboxylic acid or dicarboxylic acid derivative of said thermoplastic component and non reactive with itself or other functional groups present in the blend.

2. The thermoplastic composition of claim 1 wherein said functional groups are selected from the group comprising hydroxy (—OH), amino (—NHR) and thio (—SH) moieties, wherein R is selected from the group consisting of hydrogen and hydrocarbyl groups.

3. The thermoplastic composition of claim 1 wherein said functional group is added to said composition by the incorporation of a functional group monomer into said elastomeric component or said second polypropylene component during polymerization of said elastomeric component or said second polypropylene component, said functional group monomer is an unsaturated monomer having the general formula $$R^1(X)n$$

wherein $R^1$ is an ethylenically unsaturated hydrocarbonyl radical, X is selected from the group comprising hydroxy (—OH), amino (—NHR$^2$) and thio (—SH) moieties, wherein $R^2$ is selected from the group comprising hydrogen and hydrocarbyl groups, and n is an interger of at least 1.

4. The thermoplastic composition of claim 1 wherein said elastomeric polymer comprises from about 20 to about 90 weight percent of said ethylene.

5. The thermoplastic composition of claim 1 wherein said elastomeric polymer comprises from about 0.1 to about 15 weight percent of said functional group-containing monomer.

6. The thermoplastic composition of claim 1, wherein said terpolymer comprises from about 10 to about 20 weight percent of said diene.

7. The thermoplastic composition of claim 1, wherein said higher alpha olefin is propylene.

8. The thermoplastic composition of claim 3, wherein said functional group-containing monomer is a 2-substituted 5-norbornene selected from the group consisting of 2-methylamine-5-norbornene, 2-carboxy-5-norbornene, and 2-(N-butyl aminomethyl)-5-norbornene.

9. The thermoplastic composition of claim 8, wherein said 2-substituted norbornene is 2-methylamine-5-norbornene.

10. The thermoplastic composition of claim 1 wherein said functional group of component of said elastomeric component and said functional group of said second polypropylene component are amines having the general formula —NHR wherein R is selected from the group consisting of hydrogen and hydrocarbyl groups.

11. The thermoplastic composition of claim 10 wherein said R of said amine is selected from the group consisting of secondary amines and alcohols.

12. The thermoplastic composition of claim 10 wherein said R group of said amine is a secondary amine.

13. The thermoplastic composition of claim 1, wherein said elastomeric polymer is present in said composition as particles dispersed in said (a) and (b) thermoplastic components, said particles having a size ranging from about 0.01 to about 20 microns.

14. The thermoplastic composition of claim 1, wherein said (a) thermoplastic is a copolymer of styrene or alpha methylstyrene and maleic anhydride comprising from about 1 to about 30 weight percent maleic anhydride.

15. The thermoplastic composition of claim 14, wherein said styrene-maleic anhydride copolymer or said alpha methylstyrene-maleic anhydride copolymer comprises from about 3 to about 25 maleic anhydride.

16. The thermoplastic composition of claim 1, wherein said second polypropylene component is the reaction product of a polyamine having at least 2 amino groups and maleic anhydride grafted polypropylene.

17. The thermoplastic composition of claim 16, wherein said polyamine comprises at least one primary amino group and at least one secondary amino group.

18. The thermoplastic composition of claim 16 wherein said polyamine is selected from the group consisting of N-methyl-1,3-propanediamine, 4-(2-aminoethyl) piperazine and 4-(aminomethyl) piperidine, and mixtures thereof.

19. The thermoplastic composition of claim 1, wherein said component (a) and said component (d) have been reacted to produce a reaction product prior to compositing with said components (b) and (c) and whereby said thermoplastic composition comprises the resulting reaction product.

20. The thermoplastic composition of claim 1, wherein said polypropylene component is present in at least about 50 weight percent of the sum of said components (a)+(b)+(c)+(d).

21. The thermoplastic composition of claim 1, wherein said composition has a flexural modulus ranging from about 5500 kg/cm$^2$ to about 21,000 kg/cm$^2$ measured in accordance to ASTM D790 at 1% strain.

22. The thermoplastic composition of claim 1 further comprising a crosslinking agent for said thermoplastic component.

23. The thermoplastic composition of claim 22 wherein said crosslinking agent is a diamine.

24. The thermoplastic composition of claim 22 wherein said crosslinking agent is present in said composition in an amount ranging from 0 to about 1.5 weight percent.

* * * * *